(No Model.)
A. BARTMES, C. V. WHALLON & D. W. FRICK.
COMBINED CLOD CRUSHER AND LAND MARKER.
No. 342,995. Patented June 1, 1886.
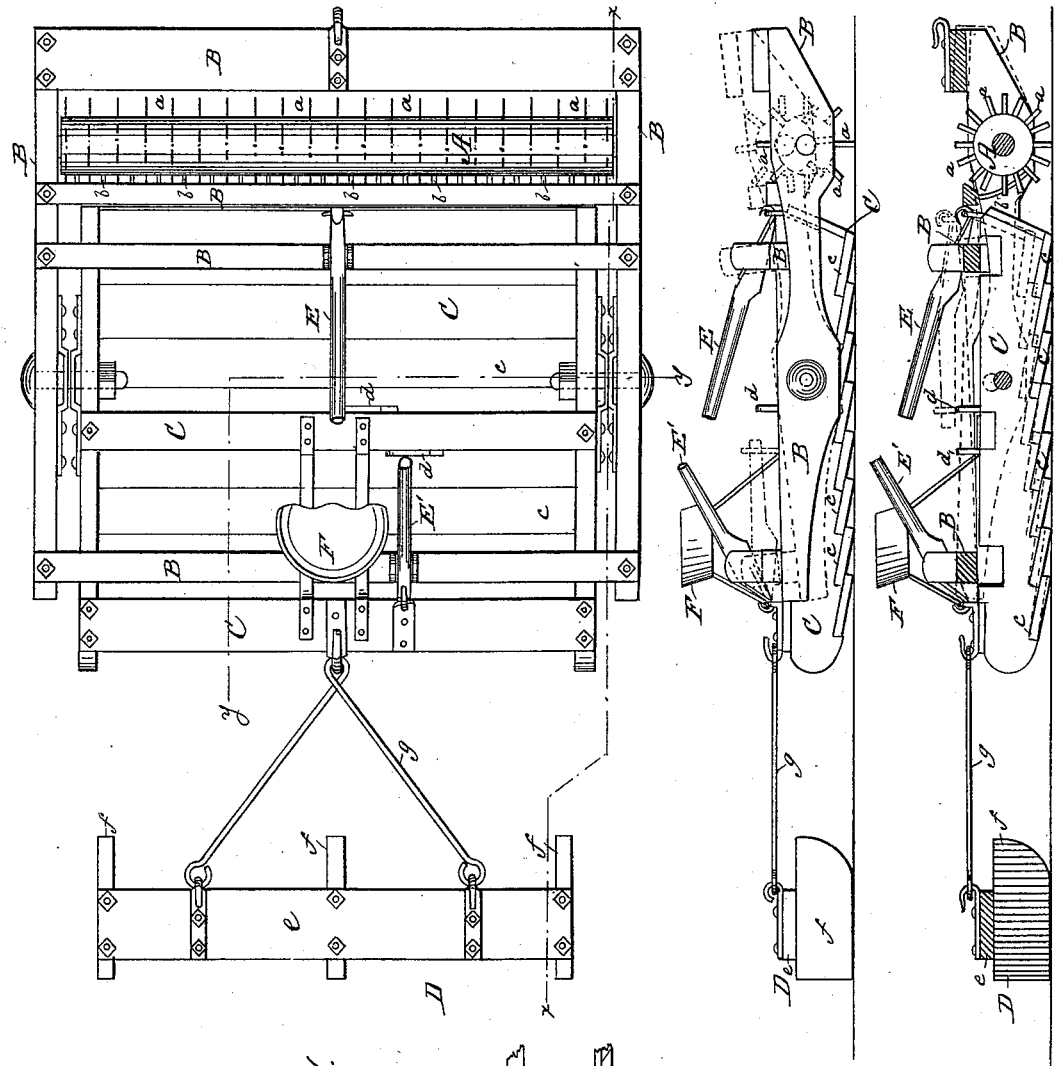
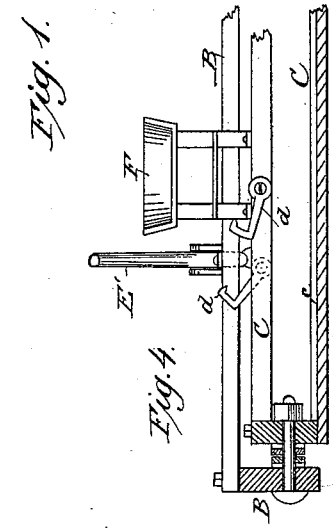
WITNESSES:
W. W. Hollingsworth
Amos W. Hart
INVENTOR:
A. Bartmes
C. V. Whallon
D. W. Frick
BY Munn & Co.
ATTORNEYS.

United States Patent Office.

ABRAHAM BARTMES, CLEMENT V. WHALLON, AND DAVID W. FRICK, OF COLD WATER, OHIO; SAID BARTMES AND FRICK ASSIGNORS TO SAID WHALLON AND JOHN W. SHIVELEY, OF SAME PLACE.

COMBINED CLOD-CRUSHER AND LAND-MARKER.

SPECIFICATION forming part of Letters Patent No. 342,995, dated June 1, 1886.

Application filed January 25, 1886. Serial No. 189,733. (No model.)

*To all whom it may concern:*

Be it known that we, ABRAHAM BARTMES, CLEMENT V. WHALLON, and DAVID W. FRICK, of Cold Water, in the county of Mercer and State of Ohio, have invented a new and useful Improvement in a Combined Clod-Crusher and Land-Marker, of which the following is a description.

Our invention is an improvement in a particular class of clod-crushers, and the features of novelty are as hereinafter described and claimed.

In accompanying drawings, Figure 1 is plan view of the entire machine. Fig. 2 is a side view. Fig. 3 is a longitudinal section on line $x$ $x$, Fig. 1. Fig. 4 is a transverse section on line $y$ $y$, Fig. 1.

The letter A indicates the toothed roller; B, the frame of the same; C, the clod-crusher proper; and D, the marker. The said roller A is journaled in and near the front ends of the side bars of frame B, and provided with sharp-pointed teeth $a$, set in spiral or zigzag rows.

The machine is drawn by a team attached to the front cross bar of frame B, and in passing over the ground (which has been previously plowed) its teeth $a$ enter and break up clods and lumps of soil. It thus operates as a clod-grinder, reducing them to a semi-pulverulent condition. To remove the soil that may adhere to and between the teeth $a$, we employ clearers $b$, Fig. 3, which are bars or rods fixed in a cross-bar behind the roller, and projecting downward, so as to work between said teeth, as shown.

The clod-crusher proper, C, is a rectangular frame having a closed bottom formed of transverse boards or bars $c$, lapping one over another, so that their angular front edges will work in contact with the soil. The function of the crusher, as substantially indicated by its title, is to reduce the soil to still finer condition, and level and smooth the same, so as to leave it properly prepared for being marked and planted or sown with seed. The crusher is pivoted about its middle to and between the side bars of the roller-frame B, so as to oscillate freely to accommodate itself, more or less, to the undulations of the ground-surface, also for the purpose of adapting it for adjustment by means of the levers E E', which are respectively connected with its front and rear ends, and have their fulcra on cross-bars of the roller frame. Their free ends project toward each other, so as to be in convenient proximity to the driver's seat F, which is secured to the clod-crusher in rear of its pivots, as shown.

By depressing the front lever, E, the front end of the clod crusher C is raised, as indicated in Fig. 3, thereby throwing part of the weight of the roller-frame B on the rear portion of the crusher, so as to increase its effect in leveling and smoothing the surface. By depressing the rear lever, E', the front end of the frame B and its attached roller A are elevated, as shown in Fig. 2, so that the machine is adapted for being drawn over grass land, roads, or other surfaces to and from the field to be worked. Hand or foot pressure may be applied to the levers to thus depress them, and pivoted hooks $d$, or any other suitable devices, may be employed to lock them.

The marker D consists of a transverse bar, $e$, and shoes or runners $f$ attached thereto and placed equidistant. It is loosely attached to the crusher proper by means of a rod, $g$.

We do not claim a clod crusher or pulverizer formed of two parts pivoted together, one of them having a closed and notched or zigzag bottom and the other being a frame carrying a spiked roller.

What we do claim is—

The improved clod-crusher formed of the pivoted frame B and spiked roller A, and the frame C, having the closed bottom $c$, and the levers E and E', connecting the two said frames at front and rear, as shown and described, whereby either end of the inner frame, C $c$, may be elevated, as and for the purpose specified.

ABRAHAM BARTMES.
CLEMENT V. WHALLON.
DAVID W. FRICK.

Witnesses:
JOHN F. ALBESS,
THEODOR BILBERMANN.